(12) United States Patent
Allyn

(10) Patent No.: US 7,373,592 B2
(45) Date of Patent: May 13, 2008

(54) MODELESS CHILD WINDOWS FOR APPLICATION PROGRAMS

(75) Inventor: Barry Christopher Allyn, Mill Creek, WA (US)

(73) Assignee: Microsoft Corporation, Redmond, WA (US)

(*) Notice: Subject to any disclaimer, the term of this patent is extended or adjusted under 35 U.S.C. 154(b) by 0 days.

(21) Appl. No.: 10/799,740

(22) Filed: Mar. 12, 2004

(65) Prior Publication Data

US 2005/0028094 A1    Feb. 3, 2005

Related U.S. Application Data

(63) Continuation of application No. 09/364,824, filed on Jul. 30, 1999, now abandoned.

(51) Int. Cl.
G06F 15/00 (2006.01)
G06F 17/00 (2006.01)
G06F 3/048 (2006.01)

(52) U.S. Cl. .............. 715/502; 715/513; 715/517; 715/526; 715/781; 715/783; 715/788; 715/790; 715/791; 715/797

(58) Field of Classification Search ................ 715/513, 715/526, 517, 502, 781, 783, 788, 790, 791, 715/797; 345/810, 803
See application file for complete search history.

(56) References Cited

U.S. PATENT DOCUMENTS 5,146,556 A * 9/1992 Hullot et al. ............... 715/790
5,179,653 A * 1/1993 Fuller ......................... 715/840
5,305,435 A * 4/1994 Bronson ..................... 715/777
5,469,540 A * 11/1995 Powers et al. ........... 715/500.1
5,487,143 A * 1/1996 Southgate .................. 715/790
5,640,498 A * 6/1997 Chew ......................... 715/790
5,870,091 A * 2/1999 Lazarony et al. ........... 715/804
6,025,841 A * 2/2000 Finkelstein et al. ......... 715/803
6,124,856 A * 9/2000 Bryan et al. ................ 715/803
6,232,971 B1 * 5/2001 Haynes ....................... 715/800
6,239,798 B1 * 5/2001 Ludolph et al. ............ 715/788
6,321,209 B1 * 11/2001 Pasquali ...................... 705/14
6,832,355 B1 * 12/2004 Duperrouzel et al. ....... 715/788
2005/0275637 A1 * 12/2005 Hinckley et al. ........... 345/173

OTHER PUBLICATIONS

Shapeware Corporation, "Getting Started with Visio," pp. 22-28.
Microsoft PressPass—Information for Journalists, "Microsoft Announces the Immediate Availability of Office 97, Market Momentum Builds for Innovative New Product Designed for Customers," Jan. 16, 1997 (4 pages) http://www.microsoft.com/presspass/press/1997/jan97/97avilpr.mspx.
Media Alert, "Microsoft to Host Online Chat with Developers and Researchers of Social User Interface, Office Assistant," (2 pages)

* cited by examiner

Primary Examiner—Rachna Singh
(74) Attorney, Agent, or Firm—Perkins Coie LLP

(57) ABSTRACT

A computer system that assists the user of computer drawing programs is described. The computer system runs an application that displays modeless windows by first displaying an application window that presents information associated with the application. After the application window is created, the computer system displays a modeless child window that overlaps the application window, and within the modeless child window information associated with the application is presented.

23 Claims, 18 Drawing Sheets

MODELESS CHILD WINDOWS FOR APPLICATION PROGRAMS

CROSS REFERENCE TO RELATED APPLICATION

This application is a continuation of U.S. application Ser. No. 09/364,824, filed Jul. 30, 1999, now abandoned entitled, "Modeless Child Windows for Application Programs", the entire contents of which are hereby incorporated by reference.

TECHNICAL FIELD

The present invention is directed to the field of computer drawing programs, and more particularly, to the field of managing allocation of real estate in an application window.

BACKGROUND OF THE INVENTION

Computer applications automate manual tasks and make available new kinds of functionality. An important issue for designers of computer applications is deciding what information to display to the user. Because the user interface to applications is typically through a computer monitor display having a relatively small display area, applications must optimize the available space on the display for elements most helpful to the user. Ideally, the display would show to the user the most useful information presented in the most efficient way. This ideal is difficult to achieve, however, because, depending on the particular user and the particular task the user is performing, different information would be the most useful, and multiple methods of presenting information exist.

Computer drawing programs are a category of computer applications that assist a computer user in producing and editing such drawings as block diagrams. flowcharts, maps, office layouts, organizational charts, project schedules, and other types of drawings. Generally, drawing programs display a number of toolbars near the top of the screen, and a working area in the other portions of the screen. For instance, as seen in FIG. 1, a toolbar area 110 of an application window 100 displayed by the drawing program can contain a variety of toolbars, some of which are user configurable. A default set of toolbars appears when the drawing program is launched. Because the toolbar area 110 contains tools that almost every user is very likely to use, its default presence on the drawing screen 100 is acceptable. A client area 114 contains a document window 116 for constructing the drawing. The user can elect to fill a portion of the client area 114 with a palette of shapes 118. Displaying the palette 118 reduces the amount of the client area 114 available for displaying the document window 116, and therefore reduces the amount of information about the drawing that can be displayed in the document window. By choosing whether the palette 118 is displayed, the user determines how much of the document window 116 is available for displaying the drawing at any given time.

In certain situations, other tools would help the user to create drawings. For instance, it would be helpful to the user to see the size and position of individual objects 120 that appear in the client area 114 of the drawing screen 100. However, having a window dedicated to displaying object size and position information would be useful sometimes, but at other times it would hinder the user. For instance, the portion of the drawing under the display area used for such a window would be obscured by the window, rendering it unavailable to the user.

Additionally, windows that present additional useful information to the user are generally modal windows. A modal window changes the mode of the program and requires input from the user before the modal window disappears and the program can resume its primary mode. For instance, when the user selects an OpenFile button 112 from the toolbar 110, a file-open pop-up window appears on the client area 114. In FIG. 2 for example, a pop-up window 210 appears when the OpenFile button 112 is pressed. This pop-up window 210 covers a large portion of the client area 114 of the drawing screen 200, obscuring the information underneath it. Additionally, the pop-up window 210 is a modal window, preventing the user from performing any other function in the drawing program until satisfactory input is received in the modal pop-up window. Once the pop-up window 210 is open, the window must be addressed by the user can return to creating the drawing. Although the information presented to the user in the pop-up window 210 is useful, forcing the user to perform some action, such as closing the modal window, is a hindrance and interrupts the flow of the user.

In view of the conflict described above between (a) providing in a drawing program additional tools and information relating to a drawing and (b) maximizing the visual area available for displaying the contents of the drawing and reducing the modality of the drawings program, a drawing program that provides additional tools and information without consuming significant visual area or increasing the modality of the drawing program would have significant utility.

DETAILED DESCRIPTION OF THE INVENTION

Figure 1:
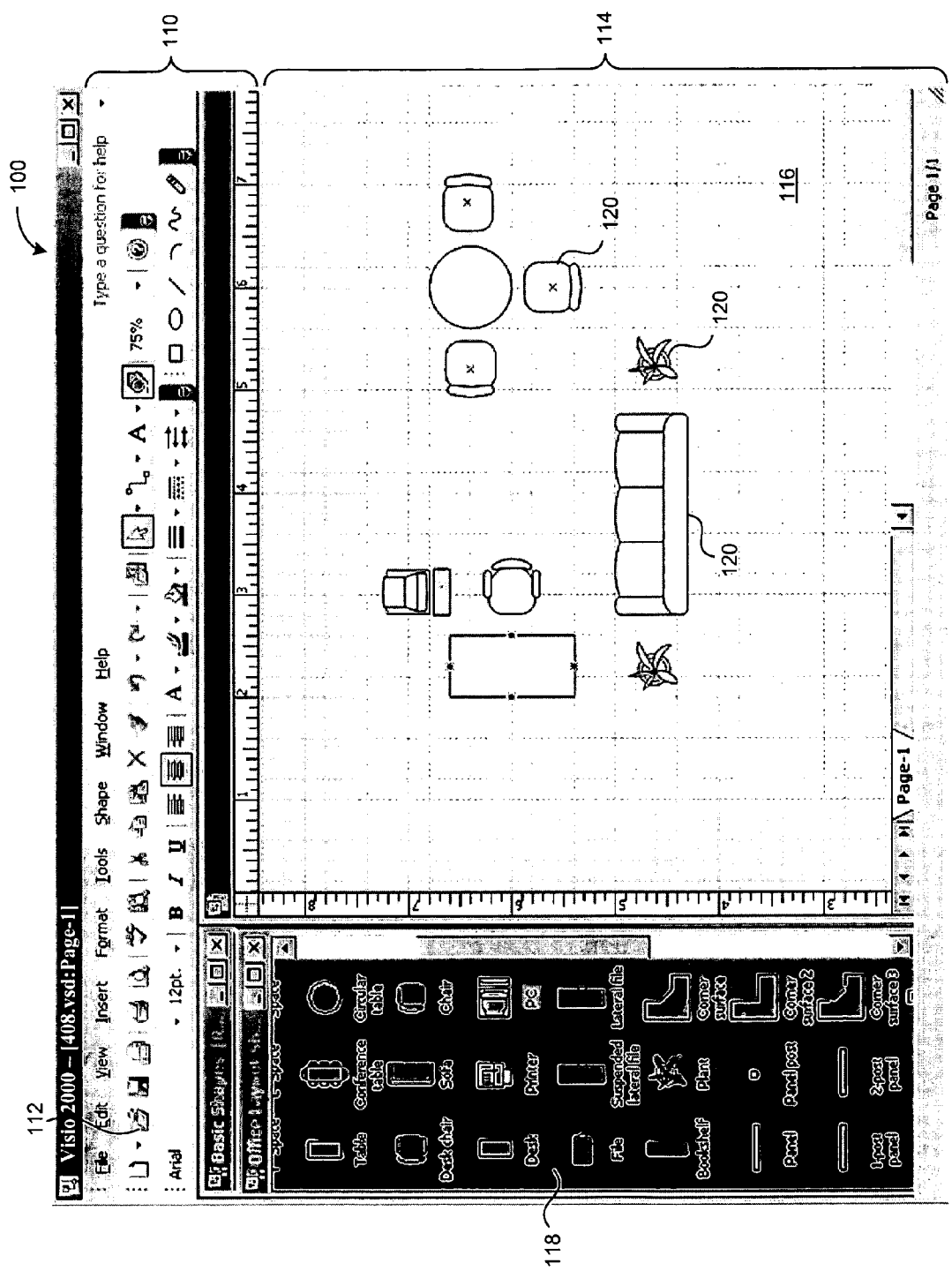
FIG. 1 is a screen shot of a drawing program.
Figure 2:
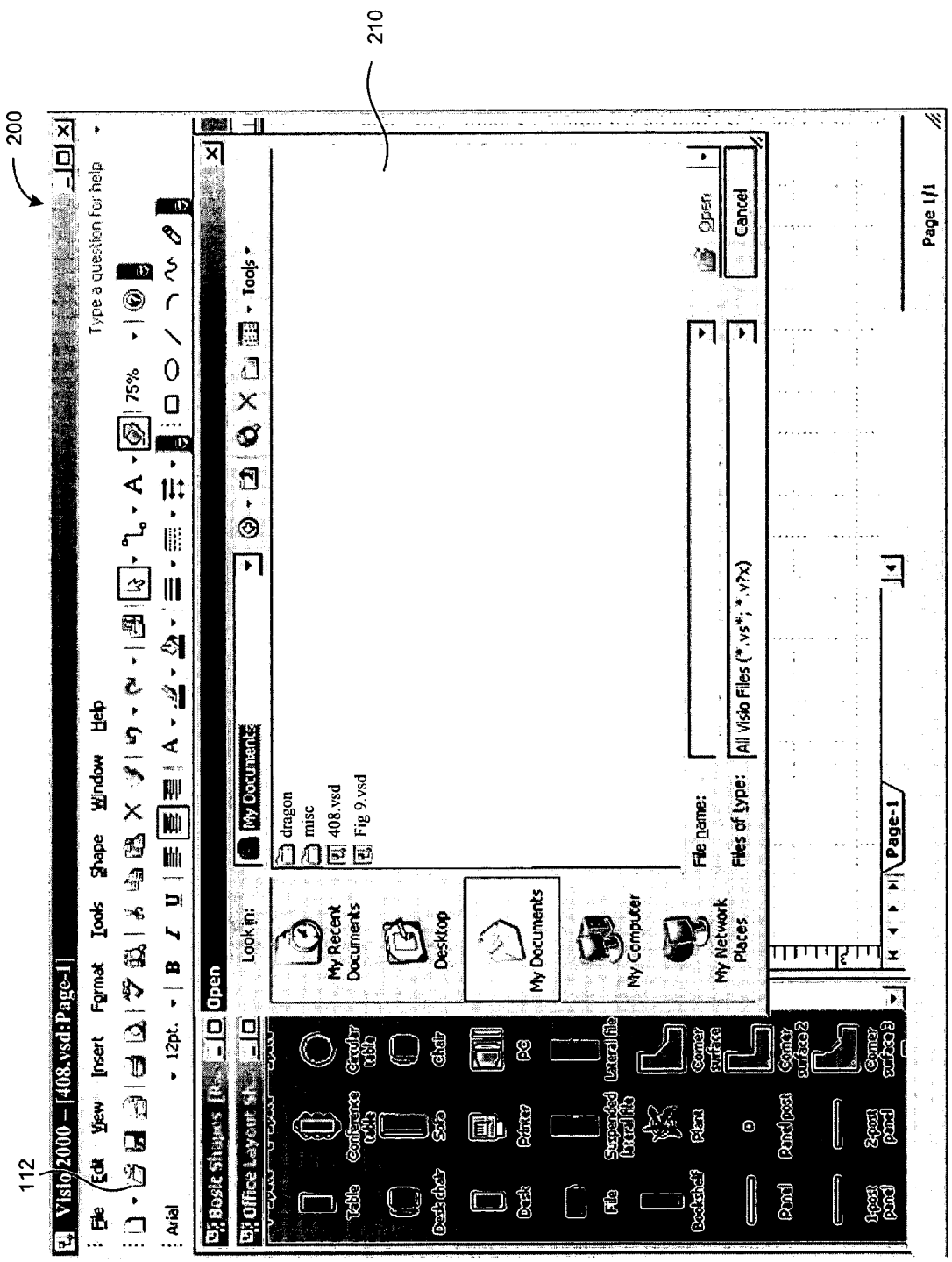
FIG. 2 is a screen shot of a drawing program displaying a modal child window.

The present invention provides a system that conveys information to the user of a drawing program by presenting modeless windows that contain information about the drawing program. These modeless windows are displayed in a client area of an application window. The drawing program displays the information to the user through the modeless windows, thereby presenting valuable information to the user of the drawing program, but giving the user the flexibility to decide which information to view.

In a preferred embodiment, the modeless window can be anchored to an edge of the display window, and intelligently expands and collapses based on input received from the user. When the input, such as input from a mouse, is proximate to a collapsed modeless window, the window automatically expands to its regular size, showing the information about the drawing program to the user. When the user moves the input away from the window, it collapses again into the collapsed condition.

The modeless windows can also be dragged from the anchored edge of the display window, which changes the window's character from anchored to floating. The floating window retains its modelessness, but information on the application window beneath the floating window is obscured from the user. The user selects which modeless windows to display, and whether to make the windows anchored or floating. In some embodiments, four types of modeless windows are available for display, including a Pan & Zoom modeless window, a Custom Properties modeless window, a Size & Position modeless window, and a drawing explorer modeless window. Each modeless window has specialized information about the computer application, and each type of window is individually selectable for display. In the balance of this description, the term "window" is used to refer to modeless windows; modal windows are explicitly referred to as such.

Figure 3:
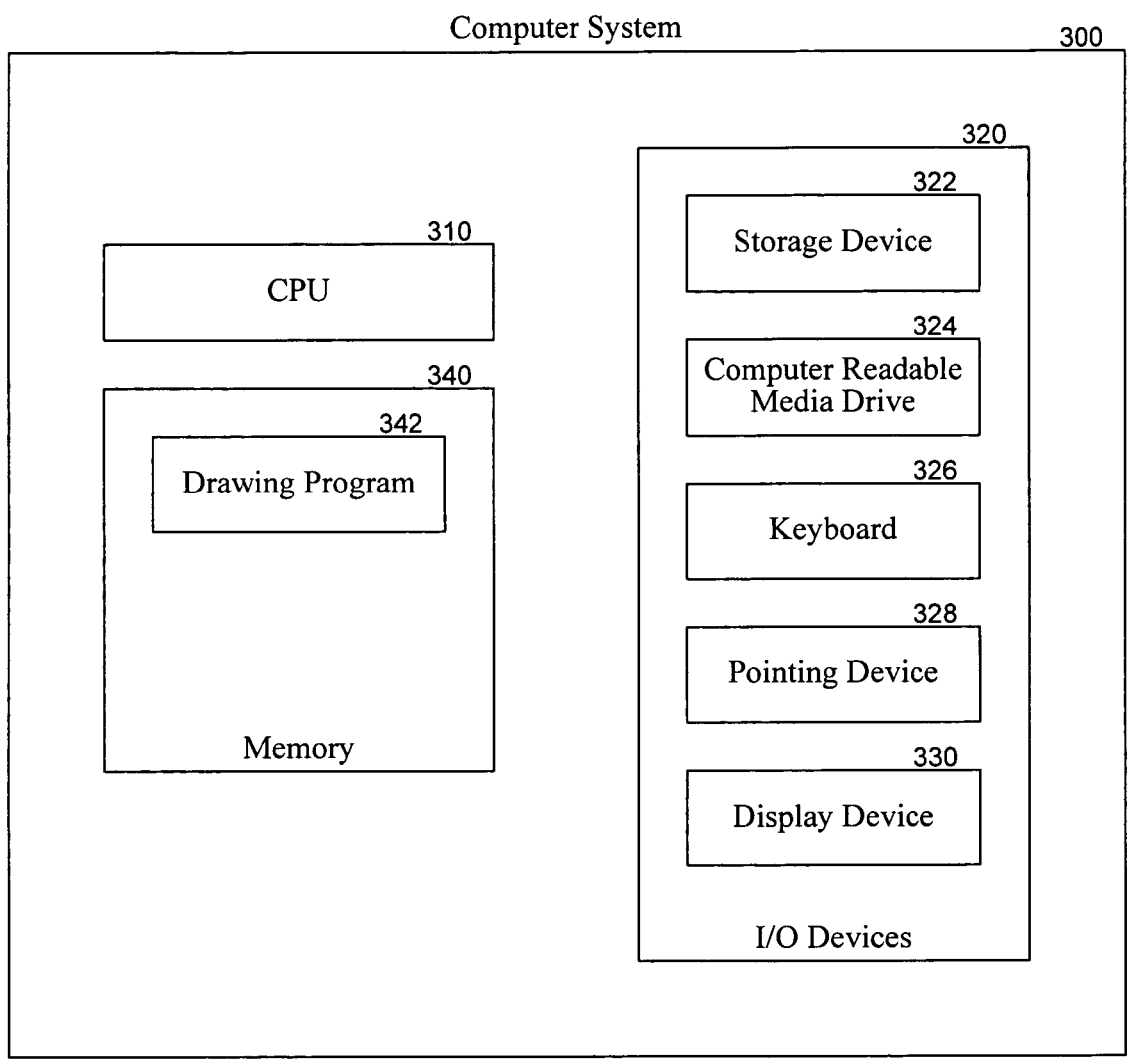
FIG. 3 is a high-level block diagram of a general-purpose computer upon which the drawing program preferably executes.

FIG. 3 is a high-level block diagram of a general-purpose computer system upon which the drawing program that displays windows preferably executes. The computer system 300 contains a central processing unit (CPU) 310, input output devices 320, and a computer memory (memory) 340. Among the input/output devices is a storage device 322, such as a hard disk drive, and a computer-readable media drive 324, which can be used to install software products, such as the computer drawing program, that are provided on a computer-readable medium, such as a CD-ROM. Other input/output devices include a keyboard 326 for inputting text, a display device 330, such as a video monitor for displaying visual information, such as windows and their contents, and a pointing device 328, such as a mouse, for moving a mouse pointer displayed on the display device to select display locations. Typically, the display device 330 is used to show the drawing that the computer user creates and the tools used to create the drawing, as well as other information relating to the drawing. The memory 340 preferably contains the drawing program 342. While the drawing program 342 is preferably implemented on a computer system configured as described above, those skilled in the art will recognize that it may also be implemented on computer systems having different configurations.

Figure 4:
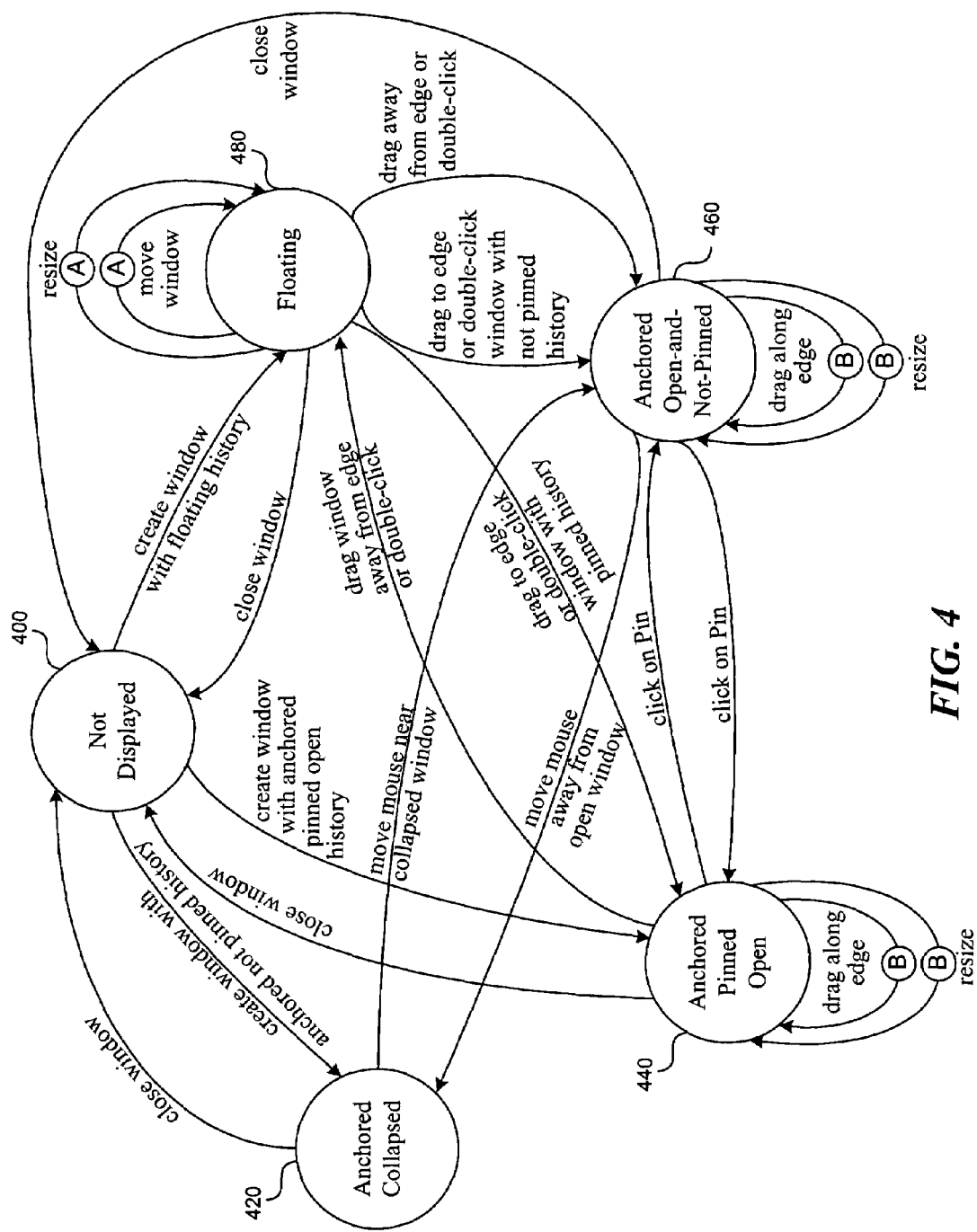
FIG. 4 is a state diagram showing different states of modeless windows preferably effected by the drawing program that displays modeless child windows.

In order to more completely describe the operation of the drawing program 142, its operation is discussed in conjunction with examples. FIGS. 4 and 14 are state and flow diagrams, respectively, indicating program operation, while FIGS. 5-13 and 15-18 illustrate the examples.

FIG. 4 is a state diagram characterizing the overall operation of the drawing program 342 to display and modify one window in the document window 116 of the drawing screen 100. Within FIG. 4 are five states of the windows. In a state 400, the particular window is not displayed. Therefore, in FIG. 1 shows an example of state 400, in which no windows are displayed in the document window 116. The other states, anchored collapsed 420, anchored pinned-open 440, anchored open-and-not-pinned 460 and floating 480 will all be described with reference to other Figures. The states are shown to be connected by arrows each representing a transition from one state to another. Each transition arrow is labeled with a condition that, when it is met while the window is in the source state, causes the window to transition to the destination state.

Figure 5:
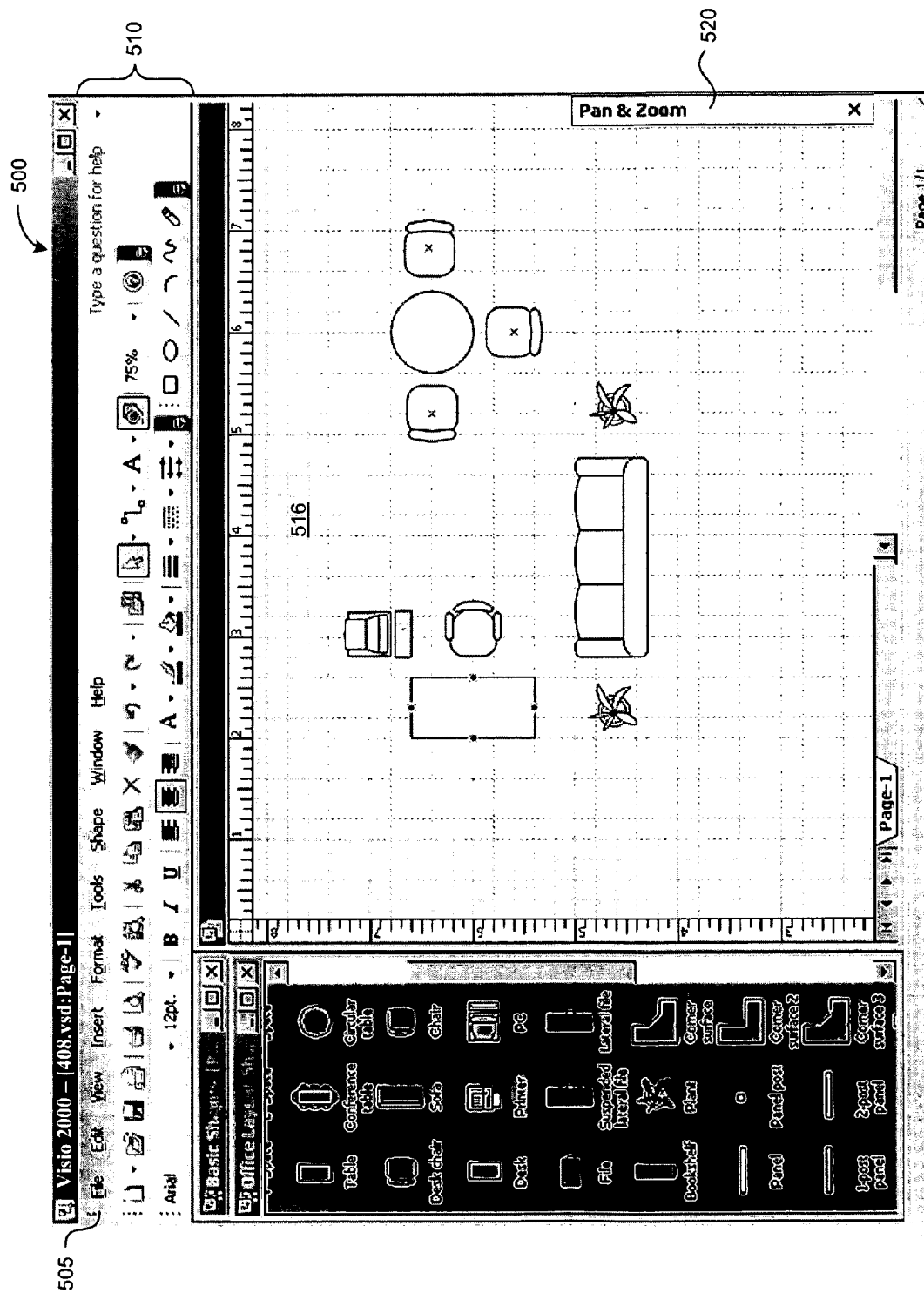
FIG. 5 is a screen shot of a drawing program displaying an anchored and collapsed modeless child window.

An example of an anchored collapsed window is shown in FIG. 5. On a drawings screen 500, in the lower right hand corner of a document window 516 is a collapsed window 520 labeled Pan & Zoom. The Pan & Zoom window 520 is created by selecting View:Windows:Pan & Zoom from a menu bar 505. Performing this step is represented in FIG. 4 by an arrow running from the not displayed state 400 to the anchored collapsed state 420. The, arrow is labeled "create window with anchored non-pinned history." which indicates the conditions that cause a window in the not displayed state 400 to transition to the anchored collapsed state 420.

Windows within the drawing program 342 can either be anchored or floating. An anchored window has at least one of its edges aligned to an edge of the document window 516. The Pan & Zoom window 520 of FIG. 5 is an example of an anchored window. The floating window has none of its edges aligned with an edge of the document window 516, such as the Pan & Zoom window 520 seen in FIG. 8. Windows in state 420, 440, and 460 are anchored, while windows in state 480 are floating.

Anchored windows can have two conditions, collapsed and open. The Pan & Zoom 520 window of FIG. 5 is a collapsed anchored window. When a user drags a pointing device such as a mouse, near an anchored collapsed window, it automatically opens to its full size. When a window is open, the window's contents are seen overlying anything in document window 516. While in the open condition, anchored windows can either be pinned-opened or not-pinned. An anchored window that is not pinned will automatically return to its collapsed state when the mouse pointer is not near the anchored window. Conversely, anchored windows that are pinned open will remain open regardless of the position of the mouse pointer. Examples of these windows are shown with reference to the Figures below. Windows in state 420 are collapsed, while windows in states 440 and 460 can open.

Referring back to FIG. 4, windows move from the not displayed state 400 to the anchored collapsed state 420, the anchored pinned-open state 440, or the floating state 480 when a "create window" condition is asserted. This condition is asserted by the computer user by issuing a command to display a particular window. The particular state the window will enter when displayed is determined by what state the window was in when it was closed. For instance, if the Pan & Zoom window 520 was in the floating state when it was closed, the Pan & Zoom window 520 then has a "floating" history. History data about each window is preferably stored in the windows registry (not shown), or any other location accessible to the drawing program 342, such as within a data structure stored in memory 340 or a file. Data including the preferred positions, of the window whether it was pinned, whether it was anchored or floating, and other useful information is stored. When the drawing program 342 is first installed on the computer system 300, initial values are given to each window's data. Once the computer user changes these values by modifying the location or size of the windows, or other modifications, the changes are kept and are available to the computer program 342 for later reference.

Therefore, when a window is displayed and leaves the not displayed state 400, the history of the window is checked. If the history is floating, the window enters the floating state 480. If the history indicates the window was last in the anchored-pinned state 440, the window will enter that state when it is displayed. Finally, if the history indicates the window was not pinned when it was closed, it has a 'not-pinned' history, and will initially display in the anchored collapsed state 420 when the window is created. In a preferred embodiment, a window cannot directly enter the anchored open-and-not-pinned state 460, but must first pass through the anchored collapsed state 420 to reach state 460.

Figure 6:
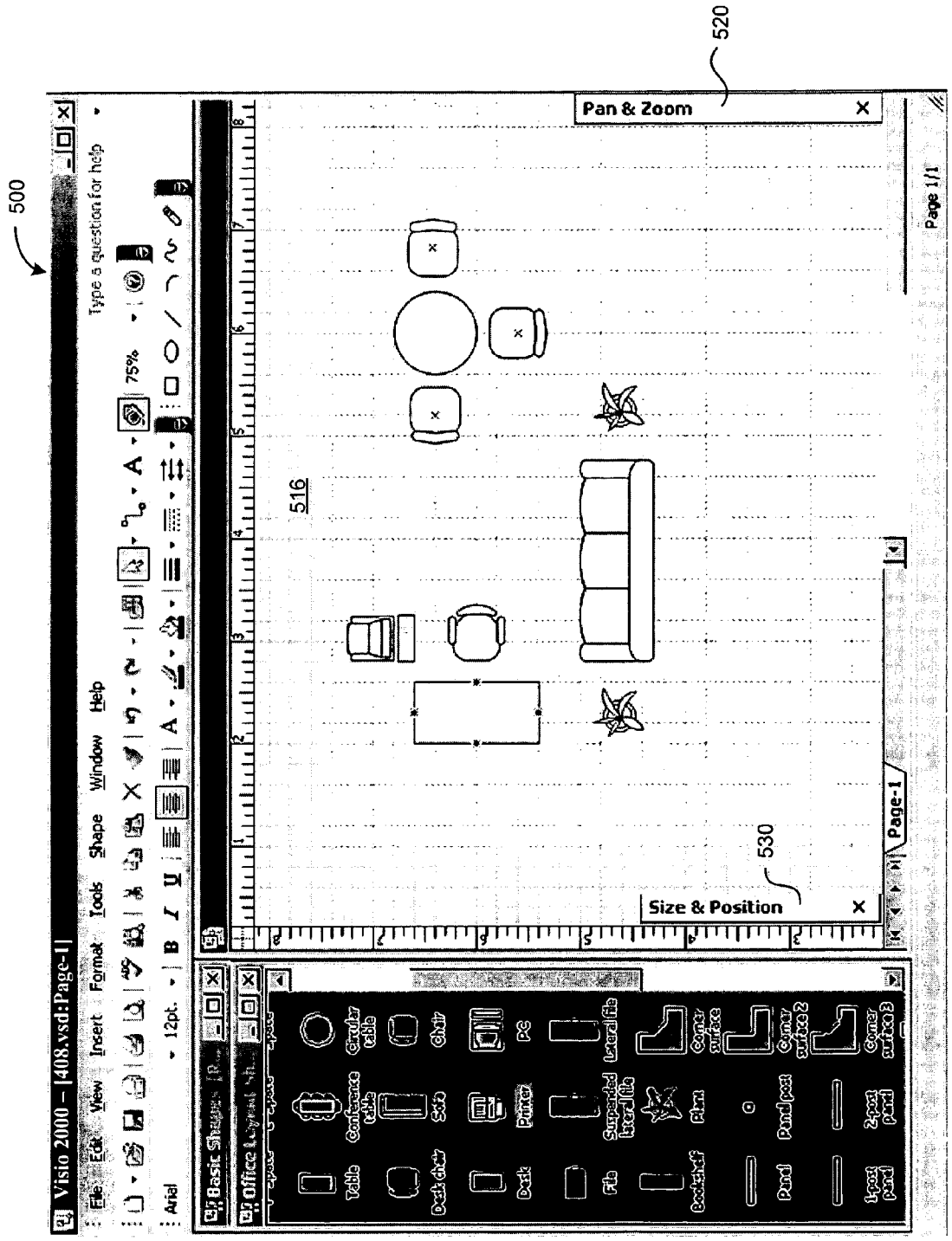
FIG. 6 is a screen shot of a drawing program displaying multiple anchored and collapsed modeless child windows.

FIG. 6 shows the drawings screen 500 after a second window 530 is created in the lower left hand corner. The Size & Position window 530 was also created with an anchored and not pinned history, therefore the Size & Position window is in the anchored collapsed state 420. Moving the mouse near a window that is the anchored collapsed state 420 causes it to move to the anchored opened-and-not-pinned state 460. From that state, clicking on a pinned button such as 532 seen in FIG. 7, causes the window to move to the anchored pinned-opened state 440. Clicking on the pin button 532 toggles the window between the anchored pinned-open state 440 and the anchored open-an-not-pinned state 460. When in the anchored-opened and not pinned state 460, the user causes the window to enter the collapsed state 420 by moving the mouse away from the open window.

Figure 7:
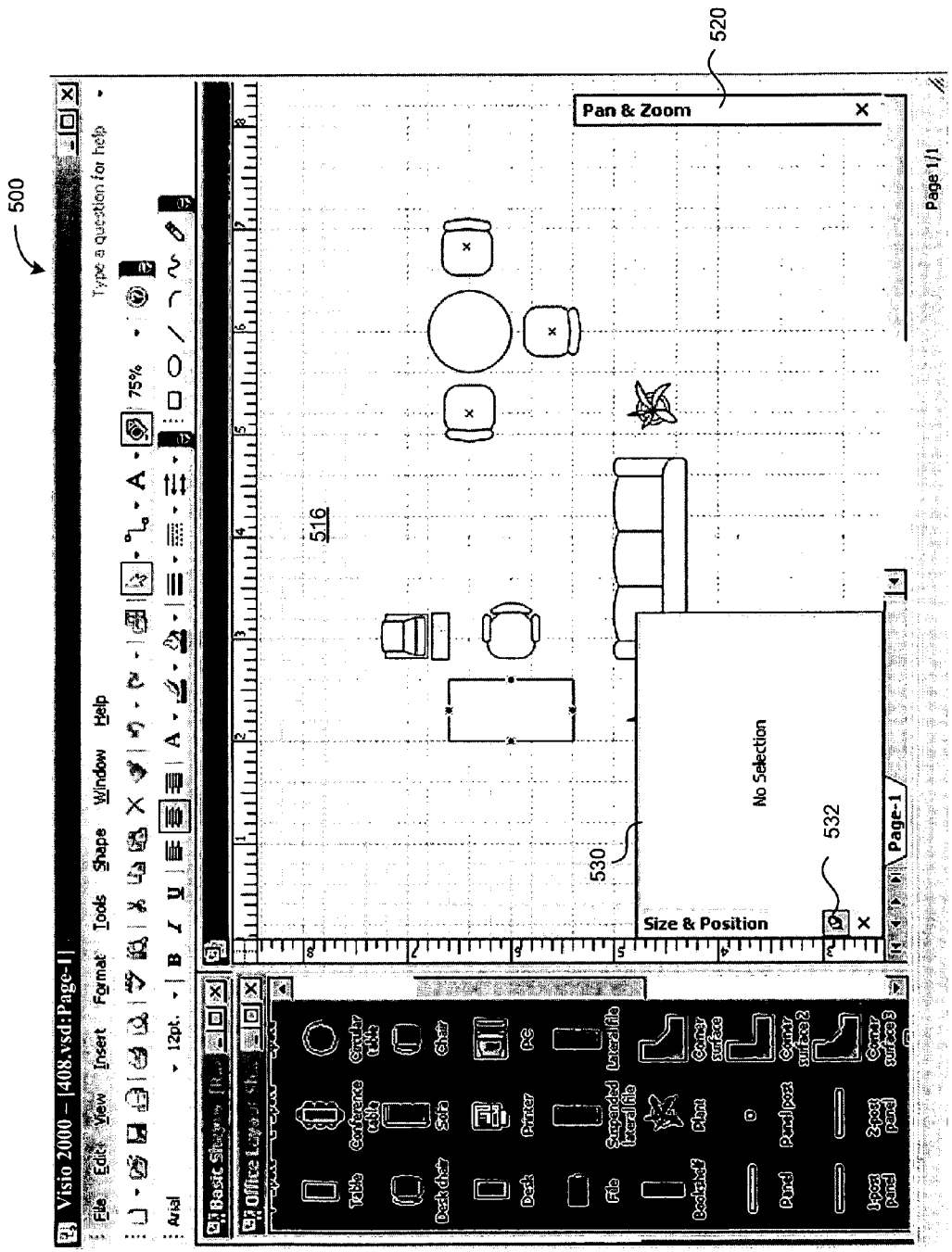
FIG. 7 is a screen shot of a drawing program displaying one anchored and collapsed modeless child window and one anchored and pinned open modeless child window.

The Size & Position window 530 is in the anchored-pinned open 440 state in FIG. 7. As described above, when the windows are open, their contents obscures the contents of the document window 516 of the drawings screen 500. Because the open windows are modeless, however, their display does not prevent the user from utilizing other features of the drawing program 342.

Figure 8:
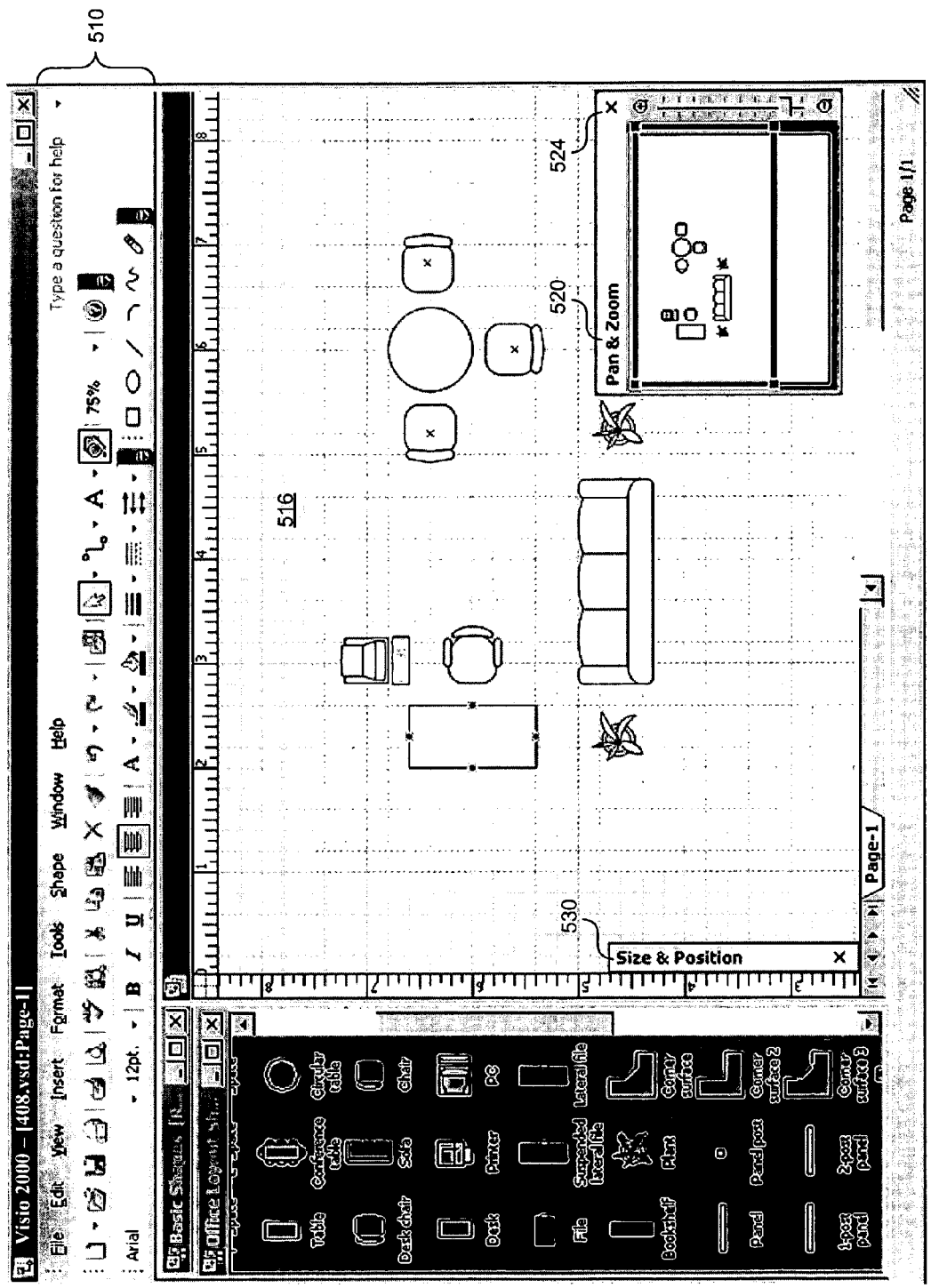
FIG. 8 is a screen shot of a drawing program displaying one anchored and collapsed modeless child window and one floating modeless child window.

To move from the anchored collapsed state 420, such as the state of the Pan & Zoom window 520 in FIG. 7, to the floating state 480, the user first moves the mouse pointer near the collapsed window. This causes the collapsed window to open. The user then drags the window by the title bar away from the edge of the document window 516, as is known in the art. An example of a the Pan & Zoom window 520 in the floating state 480 is shown in FIG. 8. To make the document window 116 appear as it does in FIG. 8, beginning from FIG. 7, the user dragged the Pan & Zoom window 520 away from the edge of the drawing area 516. Another change between FIGS. 7 and 8 is that the Size & Position window 530 is in its anchored collapsed state 420. Therefore, the user clicked the pin button 532 and moved the mouse away from the Size & Position window 530, allowing it to collapse into the position shown in FIG. 8.

Additionally, any open window can be directly closed into the non displayed state 400. Various methods of closing windows are known in the art, such as selecting a window close button 534 on the Pan & Zoom window 520 of FIG. 8, or by closing a window with a selection on the menu bar 505.

Figure 9:
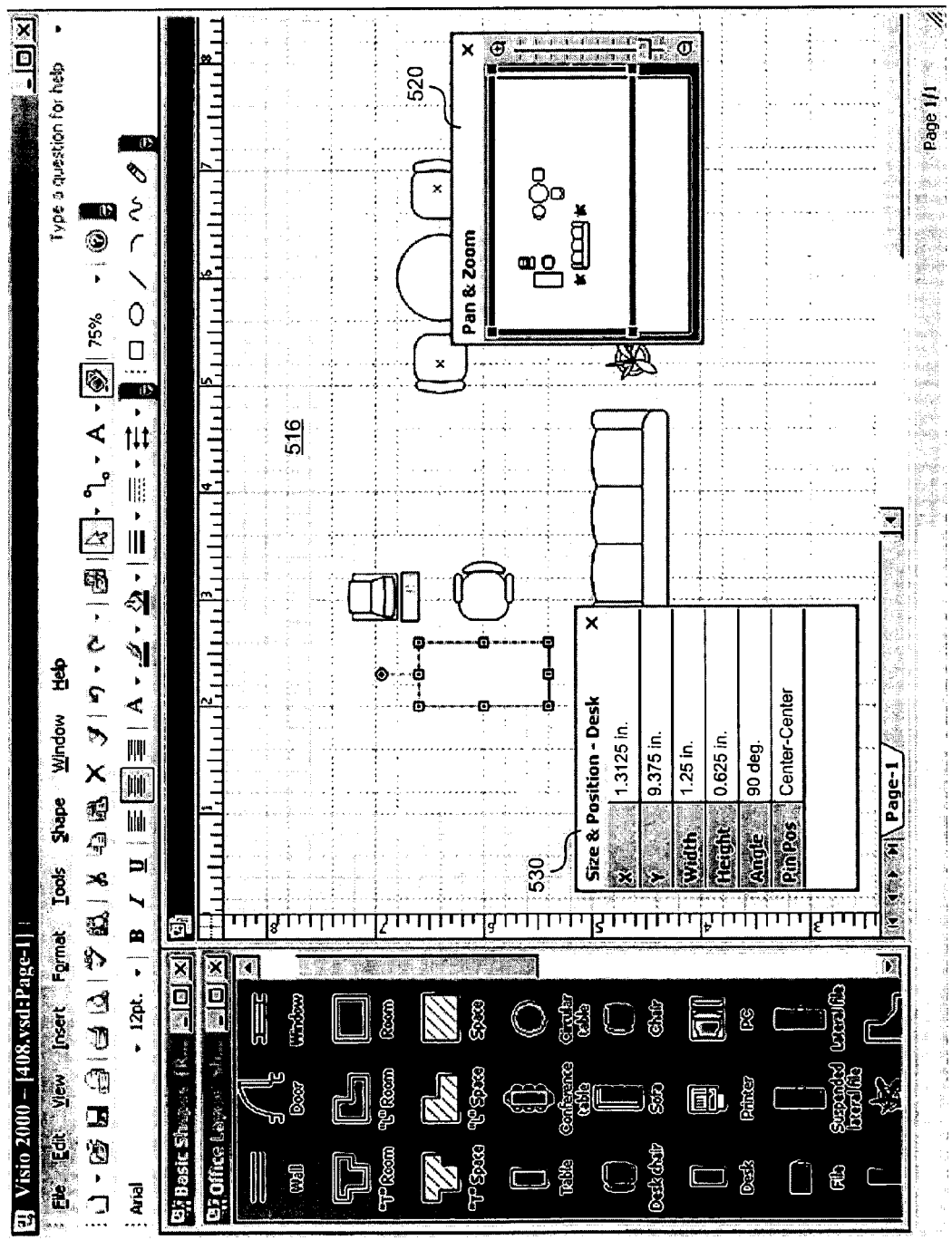
FIG. 9 is a screen shot of a drawing program displaying two floating modeless child windows.
Figure 10:
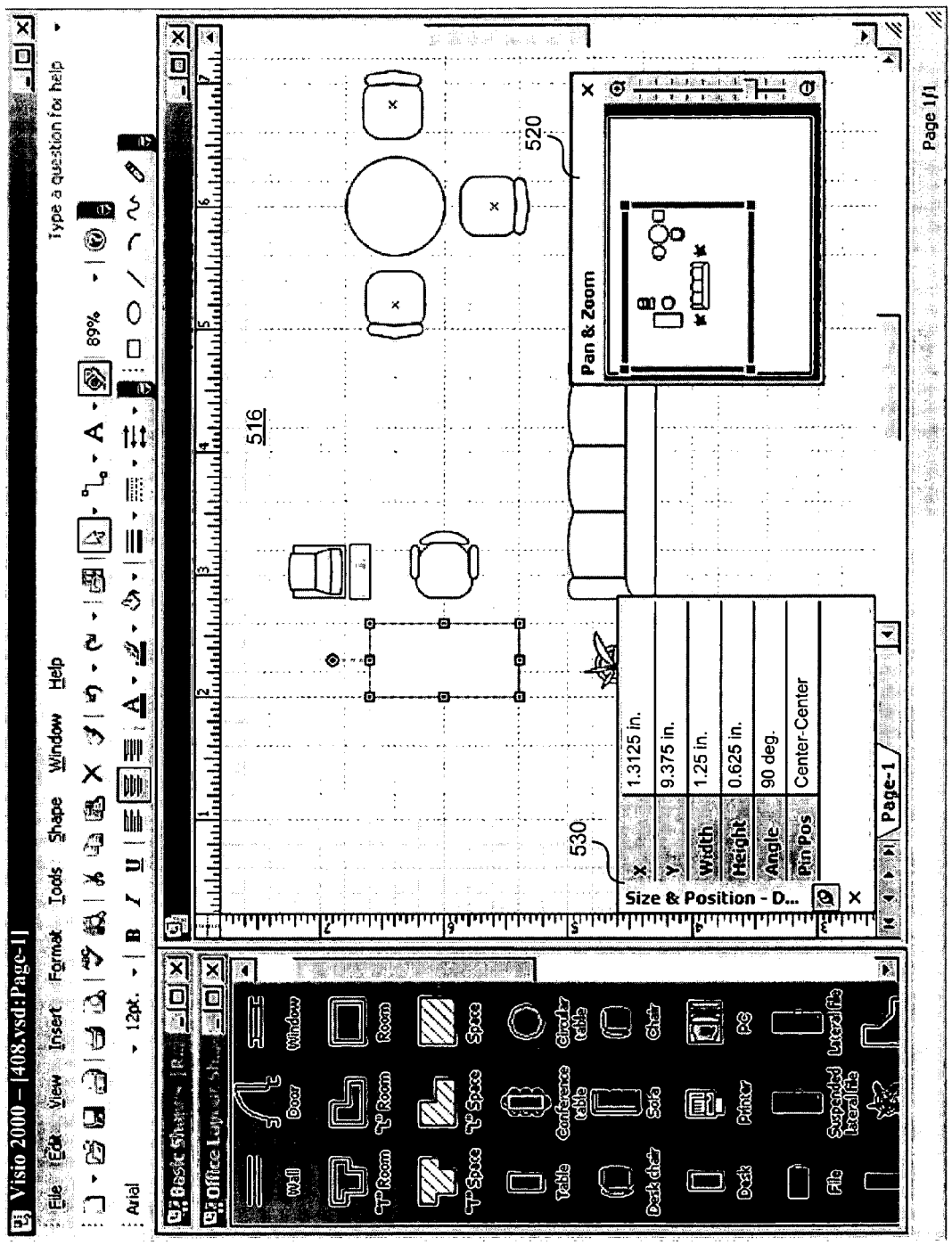
FIG. 10 is a screen shot of a drawing program displaying the windows of FIG. 9 after they are anchored to the document window.

A window can move from the floating state 480 to either the anchored opened-and-not-pinned state 460 or to the anchored pinned-opened state 440 as the user deems convenient. FIG. 9 shows an example of the document window 516 where both the Pan & Zoom window 520 and the Size & Position window 530 are in the floating state 480. To enter the anchored opened-and-not-pinned state 460 from the floating state 480, the user drags the Pan & Zoom window 520 to the edge of the document window 516, shown in FIG. 10. Once the Pan & Zoom window 520 is at the edge of the document window 516, the drawing program 342 anchors the window and, since the Pan & Zoom window was previously not pinned, enters the anchored opened-and-not-pinned state 460. In one embodiment, windows that are in the floating state 480 have a darkened title bar such as the Pan & Zoom window 520 and the Size & Position window 530 of FIG. 9. When these same windows are anchored, their title bars are no longer highlighted, as shown in FIG. 10. The Size & Position window 530 in FIG. 10 is in the anchored pinned-opened state 440. Additionally, the Size & Position window 530 is anchored to two edges of the document window 516, while the Pan & Zoom window 520 is only anchored to a single edge.

Another way to change between either of the anchored open states 440 or 460 and the floating state is by double-clicking the title bar of the window to be changed. Double-clicking on the title bar of an anchored window causes it to become a floating window, and double-clicking on the title bar of a floating window causes it to become an anchored window. As described above, each window has a history associated with it and stored in a location available to the drawing program 342, such as the windows registry. Within the history, data are stored about qualities of the window. One of those qualities is a preferred position while in an anchored state, and a preferred position while in a floating state. When the user double-clicks on the title bar of a window in the floating state, the drawing program 342 displays it at its preferred anchored state position, if possible. The drawing program 342 attempts to display each window in its preferred position, but if another window is already occupying the converted window's preferred position, the drawing program chooses another location of the windows, as described below with reference to FIG. 14.

With reference back to FIG. 4, in the preferred embodiment, it is impossible for a window that is in the anchored collapsed state 420 to be dragged or resized. When the user moves a mouse pointer near a window that is in the collapsed state 420 in an effort to move or resize it, the window automatically changes to the anchored opened-and-not-pinned state 460. Additionally, it is not possible to move a window that is in the not displayed state 400, because the window must be displayed to be moved. Therefore, windows must be in the floating state 480 to be moved or resized (described above), or the windows must be in one of the anchored and open states 440 or 460. As shown in FIG. 4, windows in either of the anchored and open states 440 or 460 can be resized, or they can be moved by dragging along the edge of the document window 116 to which they are anchored. If windows in either of the anchored and open states 440 or 460 are dragged away from the edge, or toward the center of the document window 516, the windows automatically enter the floating state 480.

The discussion above focused on creating different types of windows and changing between window states. The next section discusses positioning windows in an effort to maximize their usefulness.

One main consideration in moving and resizing windows is that each window should be fully viewable, if desired by the user. Therefore, when the windows are moved or resized, the drawing program 342 attempts to place the windows so that they do not interfere with one another. The steps to effectuate these principles are shown collectively as A, shown in FIG. 14, and described with reference to examples shown in FIGS. 12-16.

Generally, any window can be moved by the user to any location in the document window 516. Moving one of the windows around the document window 516 may affect the other displayed windows, however. Specifically, each time an anchored window is moved, the drawing program 342 checks every other anchored window to see if it can be displayed in its preferred location. Similarly, each time a floating window is moved, the drawing program 342 checks every other floating window to see if it can be displayed in its preferred location. If the windows cannot be displayed in their preferred location, the drawing program 342 attempts to locate them in the document window in positions where, if opened, they will not interfere with any of the other displayed windows. The drawing program 342 preferably does not check to see if anchored windows overlap with floating windows, and vice versa.

Figure 11:
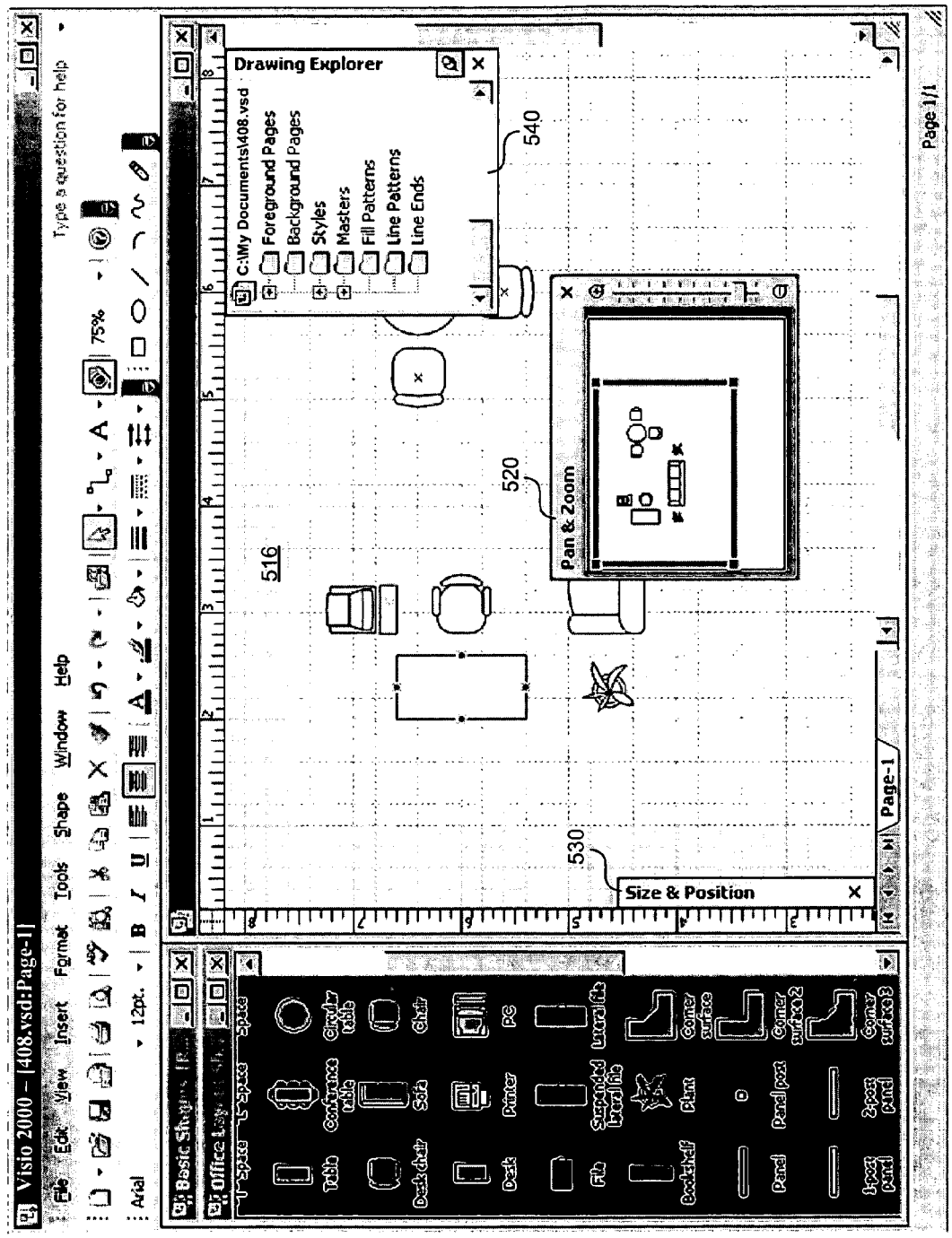
FIG. 11 is a screen shot of a drawing program displaying one floating modeless window, one anchored and pinned open modeless window and one anchored and closed modeless window.
Figure 12:
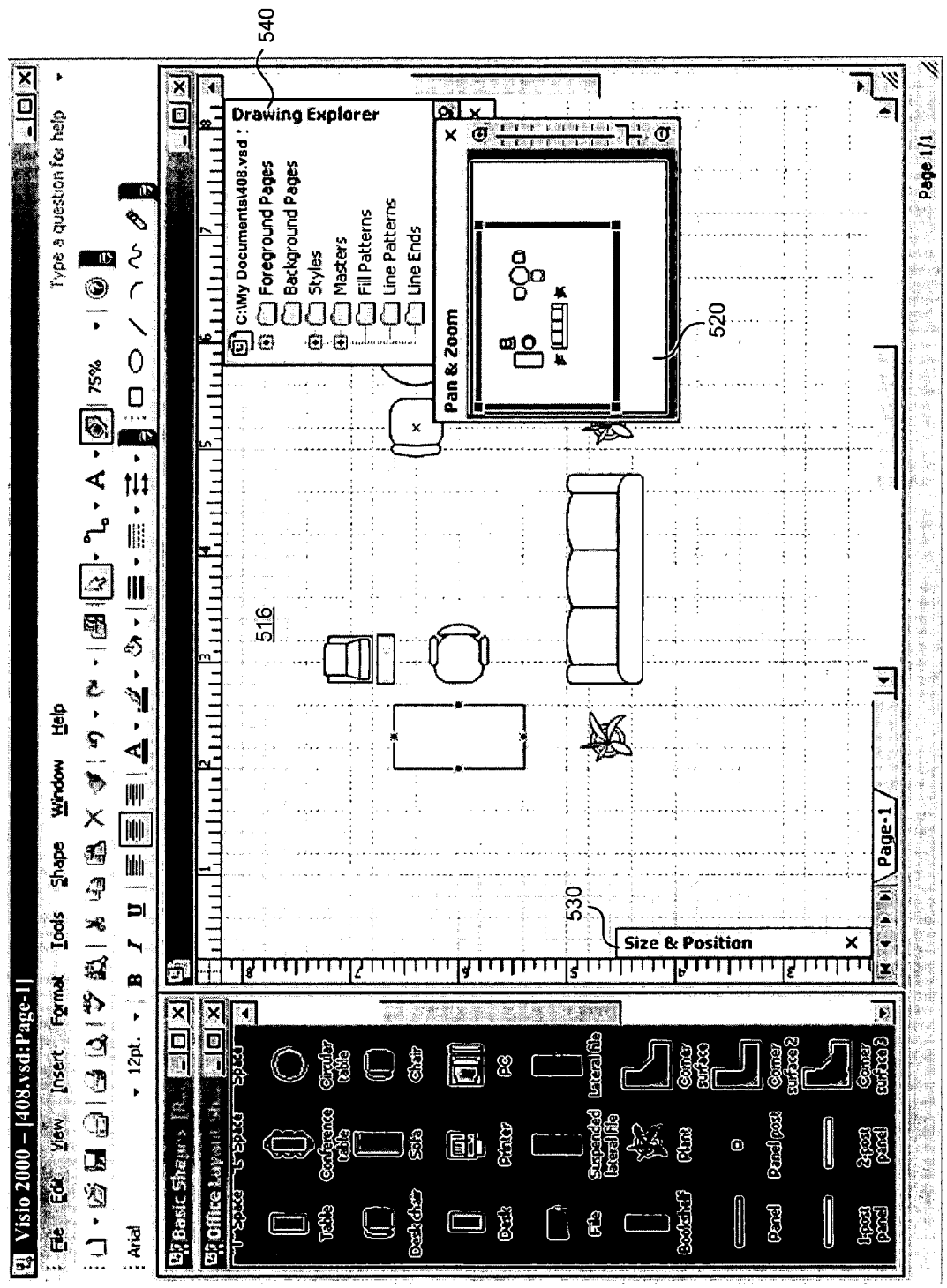
FIG. 12 is a screen shot of a drawing program displaying the floating modeless window overlapping the anchored and pinned open modeless window of FIG. 11.

FIG. 11 shows the document window 516 having three windows each in a different state. The Size & Position window 530 is in the anchored collapsed state 440. The Pan & Zoom window is in the floating state 480, and a drawing explorer window 540 is in the anchored opened-and-not-pinned state 460. FIG. 12 shows the document window 516 in a similar configuration as in FIG. 11, except the Pan & Zoom window 520 is moved so that it partially covers the drawing explorer window 540. Since the Pan & Zoom window 520 is in the floating state, the drawing program 342 does not consider the preferred position of the anchored drawing explorer window 540. Therefore, the floating Pan & Zoom window 540 covers the drawing explorer window 540.

Figure 13:
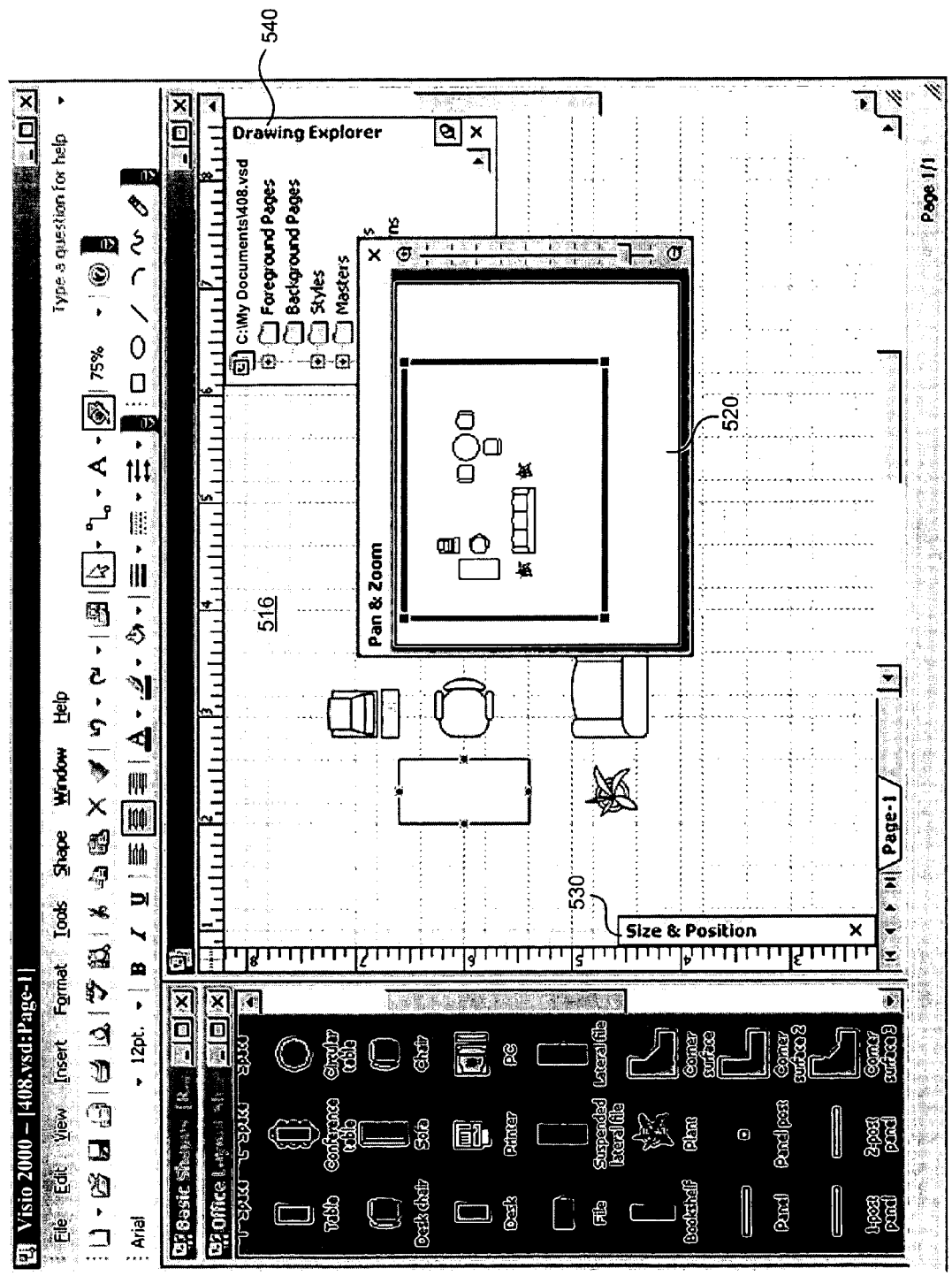
FIG. 13 is a screen shot of a drawing program displaying the floating modeless window of FIG. 11 after it has been resized.
Figure 14:
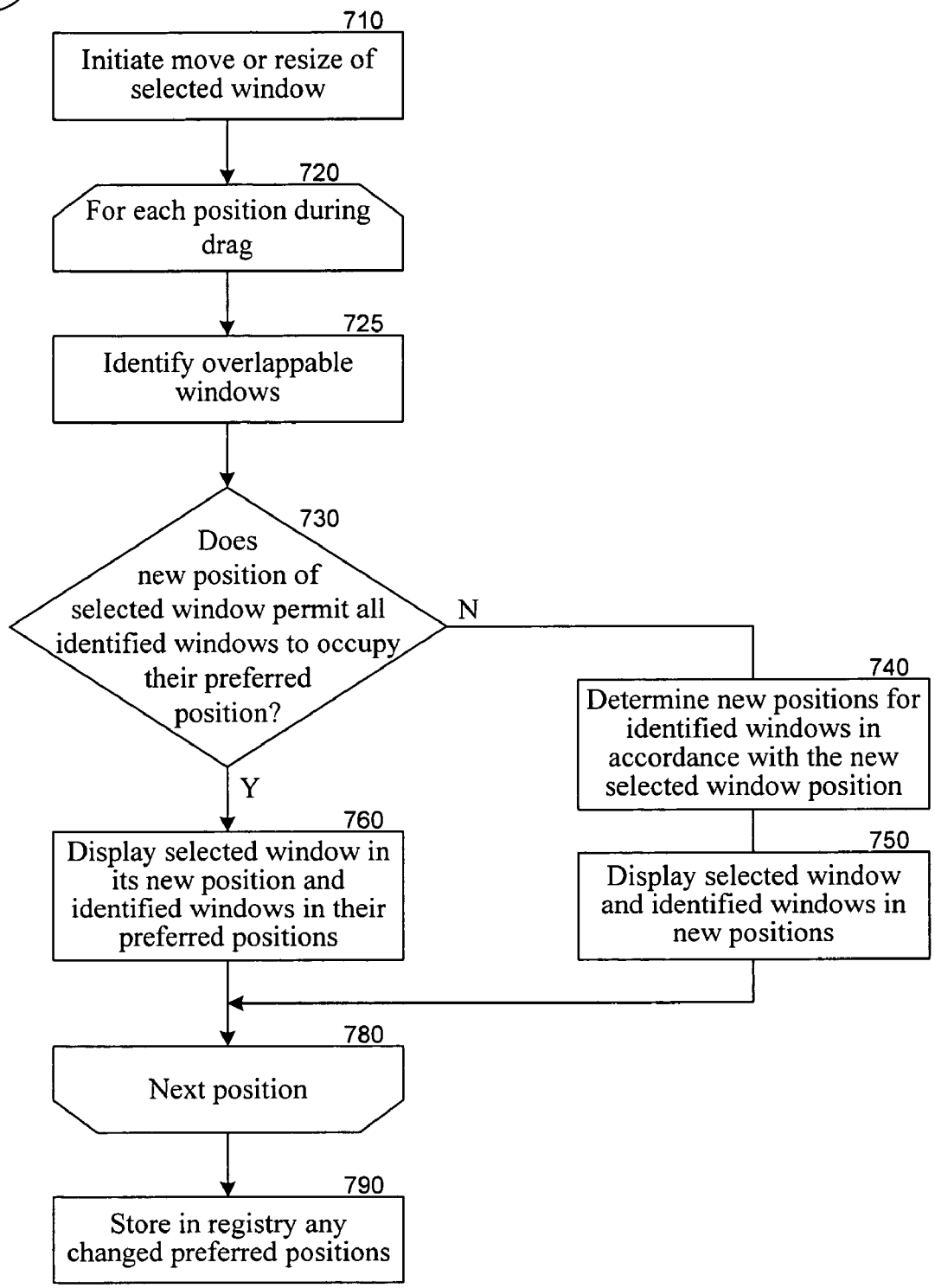
FIG. 14 is a flow diagram showing steps preferably performed by the drawing program that displays modeless child windows.

FIG. 13 shows that floating windows may similarly be resized to overlap floating windows. In FIG. 13, the Pan & Zoom window 520 has been resized by dragging an edge of the window, as is known in the art. Although not shown in FIG. 12 or 13, the drawing program would not check the preferred location of the floating Pan & Zoom window 520 if it were the drawing explorer window 540 being moved or resized.

The above examples showed moving windows when the preferred locations of the windows was not considered. The following examples show that the drawing program 342 attempts to maximize the usefulness of the windows by positioning them so they do not interfere with one another. FIG. 4 shows that moves from one state to the same state pass through steps labeled process A. These steps are shown in FIG. 14, and are described in the Examples shown in FIGS. 15-17.

Figure 15:
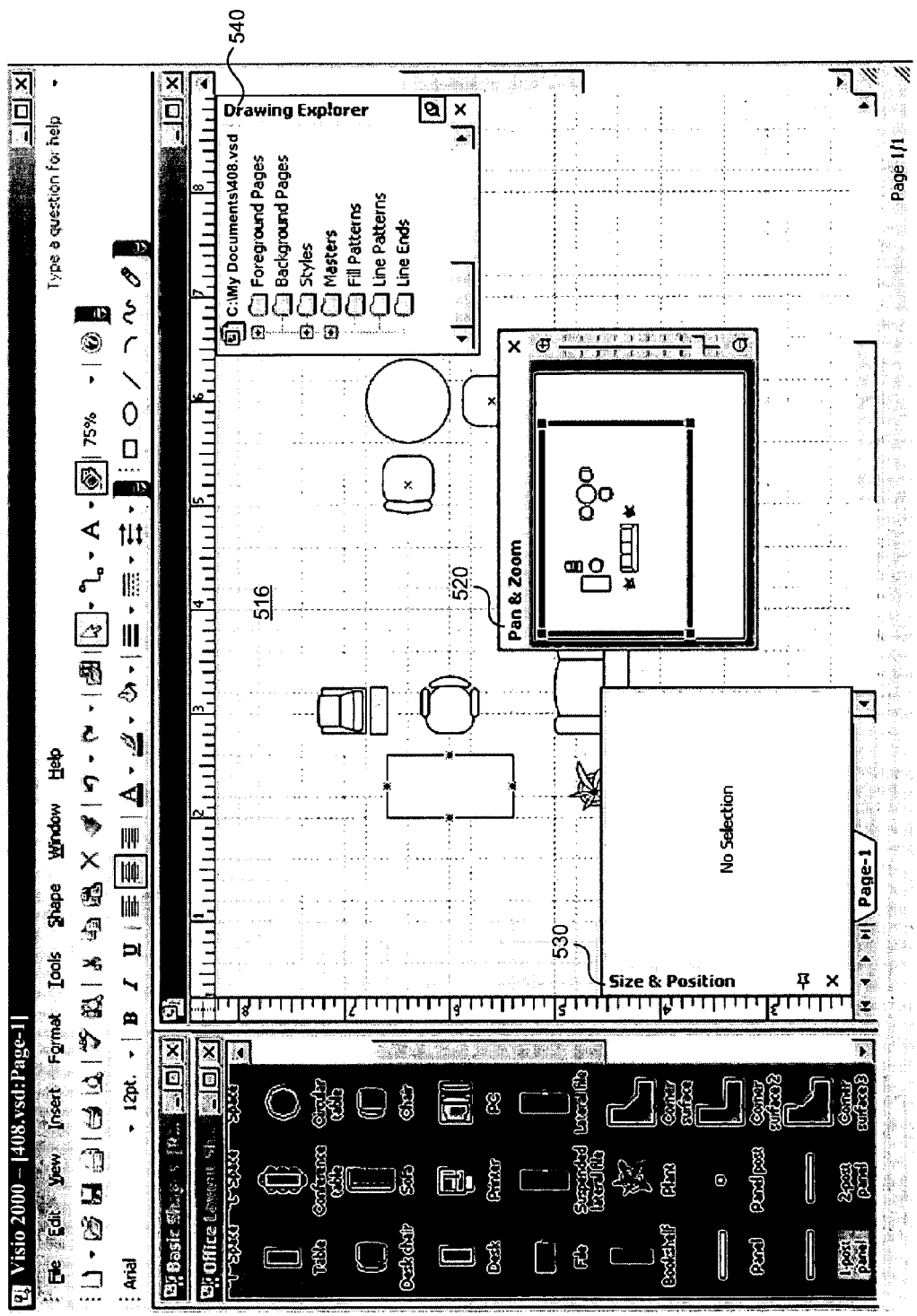
FIG. 15 is a screen shot of a drawing program that displaying three anchored and pinned open modeless child windows.

In FIG. 15, both the Pan & Zoom window 520 and the Size & Position window 530 are in the anchored pinned-open state 440. The Pan & Zoom window 520 is about to be dragged to the left. Once the move is initiated, flow A shown in FIG. 14 enters step 710. This step is entered when any anchored window is dragged along its attached edge or resized, or when the title bar of a window is double-clicked to change its character. The flow B immediately proceeds to Step 720 from step 710. Step 720 represents the top of a loop. For each position of the anchored window being dragged, the steps 730-760 are repeated. Once the final position of the drag is complete, the loop exits to step 790.

In step 725 the computer program identifies among the displayed windows those windows that are not permitted to overlap the selected window or each other. Where the selected window is a floating window, the computer program in step is 725 identifies any other displayed floating windows. Similarly, where the selected window is an anchored window, the computer program in step 725 identifies any other displayed anchored windows.

In step 730 the computer program 342 evaluates the new position of the selected window with respect to the positions of each of the windows identified in step 725 to see if the new position of the selected window permits all of the identified windows to occupy their preferred positions. An identified window depends on the type of window being moved. As is discussed further below, for the purposes of step 730, windows in the anchored collapsed state are considered to occupy the space they would occupy if there were open in one of the open states.

For instance, in FIG. 15, near the beginning of the mouse drag, all of the windows 520, 530 and 540 are anchored windows and all of them can occupy their preferred locations. As long as all of the identified windows can be so displayed, the flow A exits step 730 to step 760, where all of the identified windows are displayed in their preferred positions. Flow A continues to loop between steps 720 and 780 for each position of the mouse drag.

If the mouse drag of the Pan & Zoom window 520 continues to the left from its position in FIG. 15, eventually it will encroach on the preferred location of the Size & Position window 530. Once the windows 520 and 530 begin to overlap, the flow A will exit step 730 to step 740. In step 740, the drawing program 342 calculates a new position for any identified window that is interfered by the mouse drag, and this new position is displayed in step 750. For instance, as shown in FIG. 16, when the new position of the Pan & Zoom window 520 interfered with the preferred position of the Size & Position window 530, the drawing program 342 moved the Size & Position window from its preferred position to the closest available non interfering position along the edge of the document window 516.

Once the user completes the mouse drag to move or resize the anchored window in the flow A, the last position in step 780 will be exhausted. Thereafter, step 790 stores the locations of any windows that moved as the preferred position. In one embodiment, these preferred positions are stored in the Windows registry, but could be stored in any area accessible to the drawing program 342.

Figure 16:
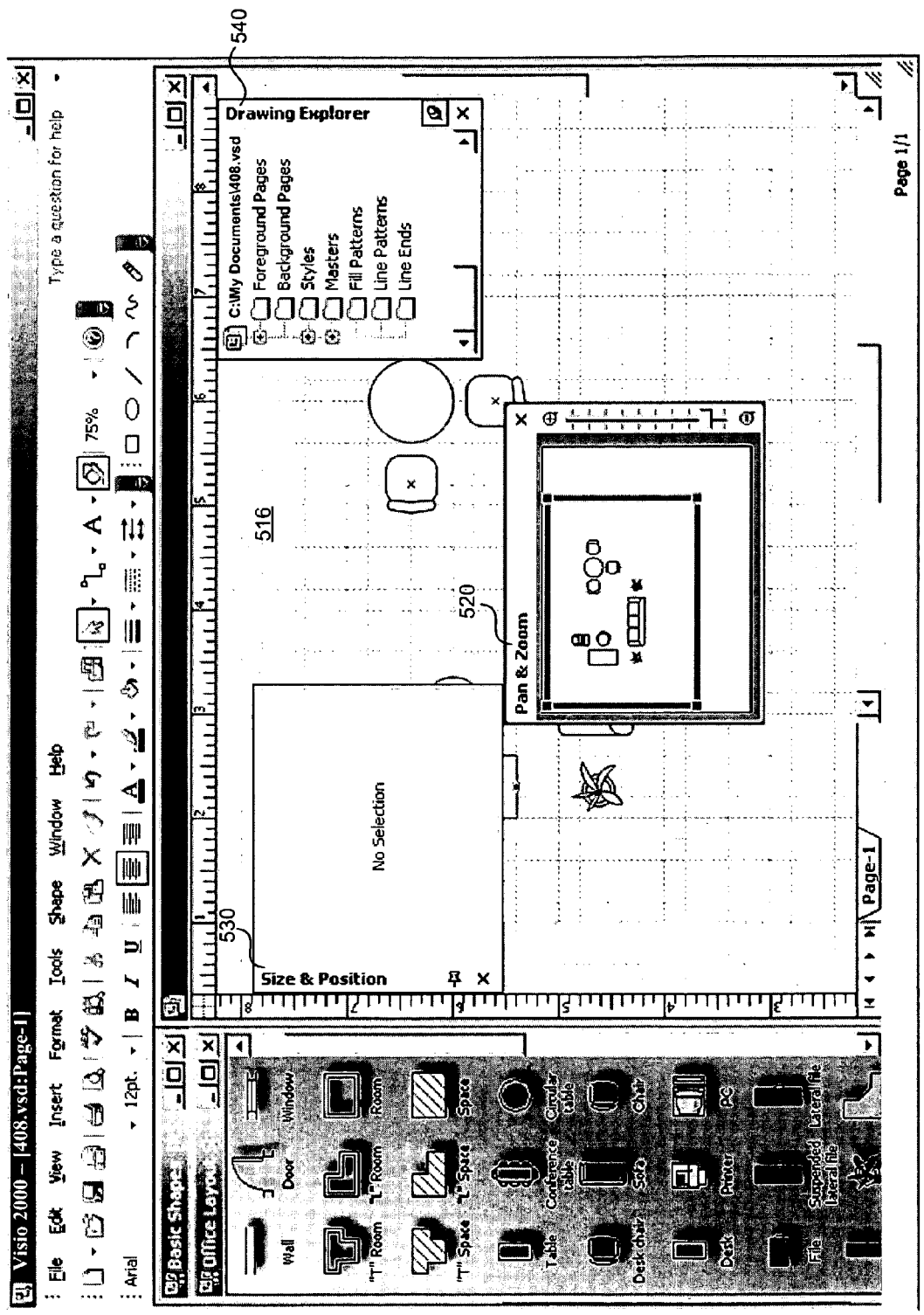
FIG. 16 is a screen shot of a drawing program illustrating the non-overlapping qualities of anchored modeless child windows.

Referring back to FIG. 15, if the user drags the Pan & Zoom window 520 to the left, causing the Size & Position window 530 to move to its location shown in FIG. 16, but the user then returns the Pan & Zoom window to its prior location before releasing the mouse, the Size & Position window will return to its location shown in FIG. 15. This occurs because for each position selected in step 720, the flow A determines if each checked window can occupy its preferred position in step 740. The preferred position of the Size & Position window 530 remains the position shown in FIG. 15, because the drawing program 342 only updates the preferred position once after the mouse drag is complete. Therefore, when the Pan & Zoom window 520 returned to a non interfering position, the Size & Position window 530 also returned to its preferred position.

Figure 17:
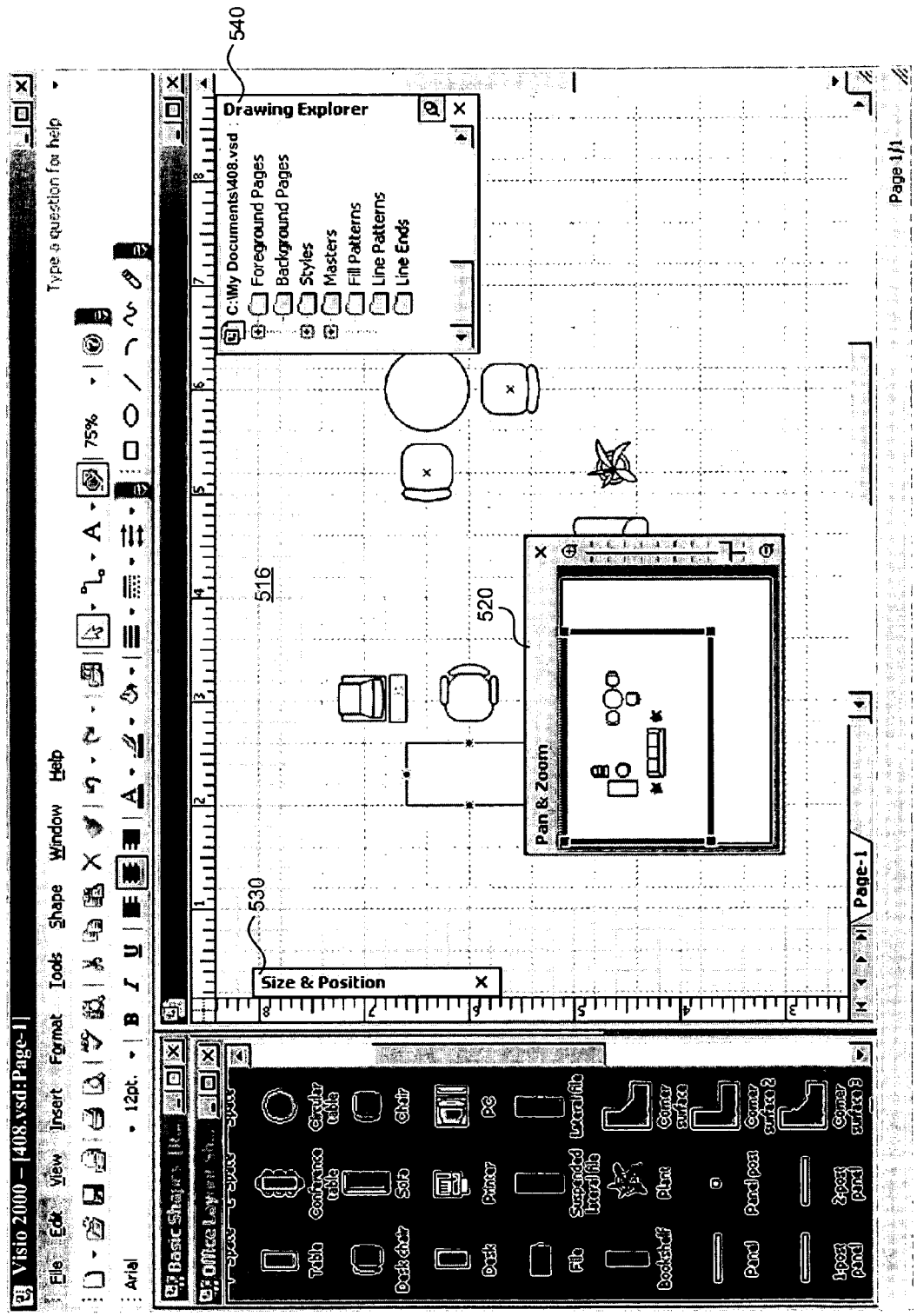
FIG. 17 is a screen shot of a drawing program that further illustrating the non-overlapping qualities of anchored modeless child windows, even when the anchored windows are collapsed.

In some embodiments of the invention, the preferred location of the anchored windows is calculated as if the window were open, even if it is not open. For instance, as seen in FIG. 17, even though when the Pan & Zoom window 520 is dragged to the left it wouldn't interfere with the Size & Position window 530 in its collapsed state, the drawing program 342 considers the Size & Position window to be in its open state. Therefore, the drawing program 342 moves it to the same location as seen in FIG. 16, but retains the collapsed position of the Size & Position window 530. Although FIGS. 15 and 16 show examples of anchored windows being displaced, the same consideration is given to floating windows with respect to other floating windows.

Figure 18:
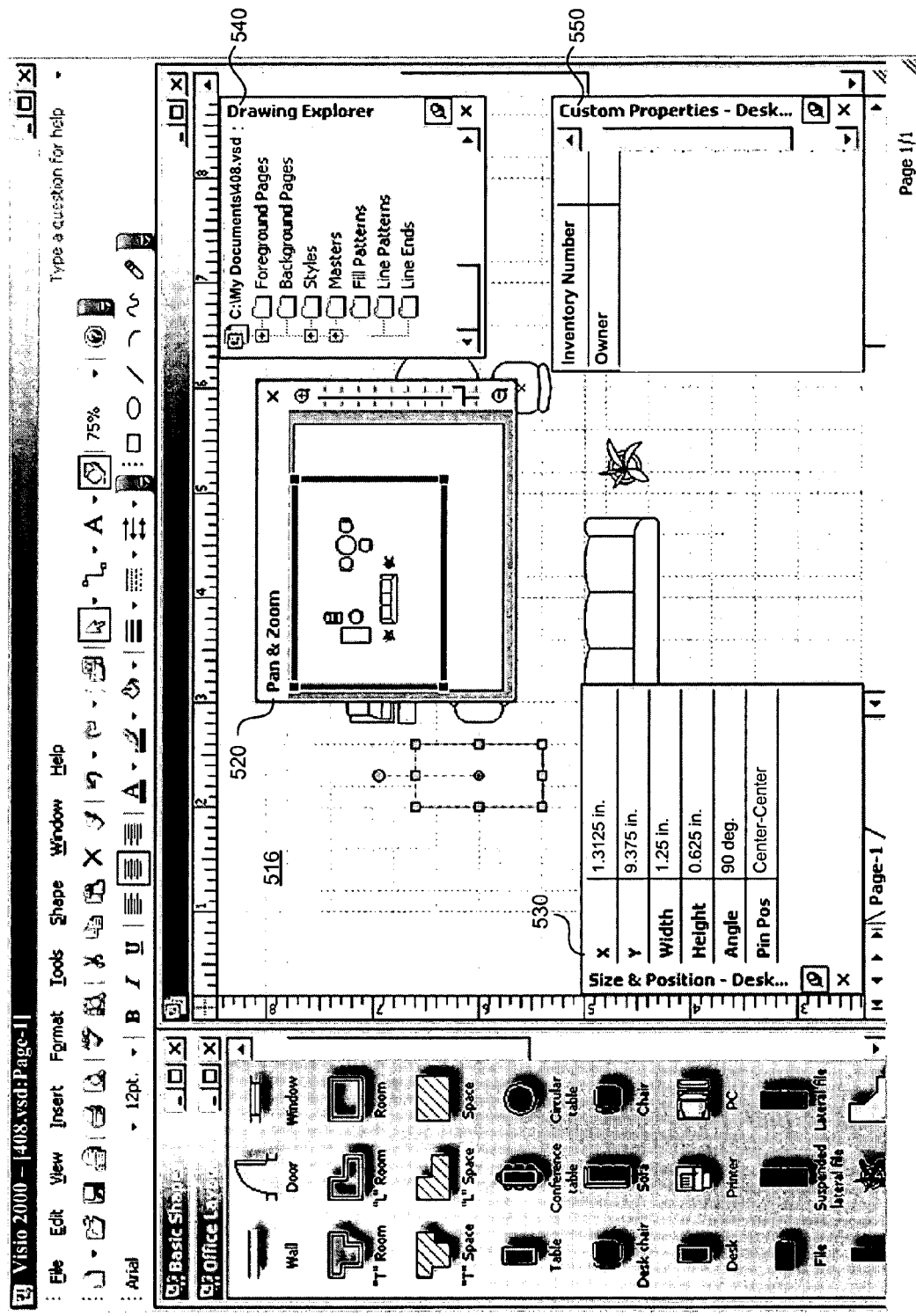
FIG. 18 is a screen shot of a drawing program illustrating different types of modeless child windows.

Examples of windows that contain information useful to user of the drawing program 342 are shown in FIG. 18. The Pan & Zoom window 520 contains a miniature display of the drawing. In the Pan & Zoom window 520, the user can draw a box around the area of the drawing to be displayed in the document window 516. This allows the user to easily move locations in the drawing.

The Size & Position window 530 contains information specific to the item that is selected. In the drawing shown in the document window 116 of FIG. 19, a desk item 502 is selected. The Size & Position window 530 shows that the desk is rotated 90 degrees from its normal orientation and has a width of 1.25 inches. Changes made directly to the desk 502, such as by dragging the mouse to change the width of the desk, automatically appear in the Size & Position window 530. Conversely, the user may enter a new width for the desk directly in the Size & Position window 530, which is then reflected in desk 502 displayed in the document window 516.

A custom properties window 550 also references the currently selected item, in this case, the desk 502. Specific properties such as owner or inventory number can be recorded within the custom properties window 550. Also, additional properties can be created and stored in the custom properties window 550.

The drawing explorer window 540 allows the user of the computer program 342 to easily see folders and files on the computer on which the computer program 342 is running. This window enables the user to easily reference other drawings stored in other files on the computer system 300. All of the windows shown in FIG. 19 automatically update information from the drawing program 342. Also, all of the windows are and therefore do not require any input from the user, freeing the user to create his or her drawing.

From the foregoing it will be appreciated that, although specific embodiments of the invention have been described herein for purposes of illustration, various modifications may be made without deviating from the spirit and scope of the invention. Accordingly, the invention is not limited except as by the appended claims.

I claim:

1. A method in a computer system for displaying modeless windows, the computer system running an application, the method comprising:

displaying an application window having a client area;
within the client area, displaying a document window;
displaying a first modeless window and a second modeless window both wholly within the document window and anchored to an edge of the document window, the anchored first and second modeless windows having collapsed and expanded states; and
when the first modeless window is in the collapsed state, displaying its identifier in a first visible region without displaying its contents;
when the second modeless window is in the expanded state, displaying its contents in a second visible region; and
when user input is received proximate to the first visible region of the first collapsed modeless window,
determining a preferred position of the first collapsed modeless window based upon its size in an expanded state, the preferred position calculated to prevent the first modeless window in the expanded state from overlapping the second visible region of the second modeless window;
expanding the first collapsed modeless window so that it is in the expanded state and anchored to the edge of the document window based on the preferred position;
displaying information associated with the document within the expanded modeless window; and
when user input is received that is not proximate to the expanded first modeless window, collapsing the expanded first modeless window so that it is in the collapsed state.

2. The method of claim 1, further comprising updating information displayed in the expanded first modeless window to reflect a change in the information associated with the application changes.

3. The method of claim 1 wherein the expanded first modeless window has two or more non collinear sides, and wherein portions of a document displayed in the document window are displayed adjacent to at least two of the sides of the expanded first modeless window.

4. The method of claim 1 wherein the expanded first modeless window is a child window.

5. The method of claim 1 wherein the user input is a double-clicked mouse.

6. The method of claim 1 wherein the second modeless window contains information regarding the application.

7. The method of claim 1 wherein the first modeless window and the second modeless window are non-overlappable.

8. The method of claim 1, further comprising changing the position of the second modeless window in response to user input.

9. The method of claim 1 wherein the method further includes displaying a third modeless window in the document window and wherein the third modeless window contains information regarding the application.

10. The method of claim 9 wherein the expanded first modeless window and the third modeless window are non-overlappable.

11. The method of claim 1, further comprising changing the size of the expanded first modeless window in response to user input.

12. The method of claim 11, wherein the user input is via a pointing device.

13. The method of claim 12, further comprising:

expanding a collapsed modeless window when the input from the pointing device selects a display position that is near the modeless window; and collapsing the expanded modeless window when the input from the pointing device selects a display position that is not near the modeless window.

14. A computer-readable medium whose contents cause a computer system that is running an application to display modeless windows by:

displaying an application window having a client area;

within the client area, displaying a document window;

displaying a first modeless window and a second modeless window both wholly within the document window and anchored to an edge of the document window, the anchored first and second modeless windows having collapsed and expanded states; and when the first modeless window is in the collapsed state, displaying its identifier in a first visible region without displaying its contents;

when the second modeless window is in the expanded state, displaying its contents in a second visible region; and when user input is received proximate to the first visible region of the collapsed first modeless window, determining a preferred position of the first collapsed modeless window based upon its size in the expanded state, the preferred position calculated to prevent the first modeless window in the expanded state from overlapping the second visible region of the second modeless window;

expanding the first collapsed modeless window so that it is in the expanded state and anchored to the edge of the document window based on the preferred position;

displaying information associated with the document within the expanded modeless window; and when user input is received that is not proximate to the expanded first modeless window, collapsing the expanded first modeless window so that it is in the collapsed state.

15. The computer readable medium of claim 14 wherein the contents of the computer-readable medium further cause the computer system to update information displayed in the first modeless window as the information regarding the application changes.

16. The computer readable medium of claim 14 wherein the expanded first modeless window has two or more non collinear sides, and wherein portions of a document displayed in the document window are displayed adjacent to at least two of the sides of the expanded first modeless window.

17. The computer readable medium of claim 14 wherein the expanded first modeless window is a child window.

18. The computer readable medium of claim 14, further comprising changing a state of the first modeless child window responsive to additional user input.

19. The computer readable medium of claim 14 wherein the contents of the computer readable medium further cause the computer system to close the first modeless child window responsive to other input received from the user and reopen in same position.

20. The computer readable medium of claim 14 wherein the contents of the computer readable medium further cause the computer system to detach the modeless child window from the edge of the display window when directed by the user.

21. The computer readable medium of claim 14 wherein the contents of the computer-readable medium further cause the computer system to change the size of the expanded first modeless window in response to user input.

22. The computer readable medium of claim 21 wherein the contents of the computer-readable medium further cause the computer system to receive the user input via a pointing device.

23. The computer readable medium of claim 22 wherein the contents of the computer-readable medium further cause the computer system to display modeless windows by:

expanding a collapsed modeless window when the input from the pointing device is near the modeless window; and collapsing the expanded modeless window when the input from the pointing device is not near the modeless window.

* * * * *

UNITED STATES PATENT AND TRADEMARK OFFICE
CERTIFICATE OF CORRECTION

| | | |
|---|---|---|
| PATENT NO. | : 7,373,592 B2 | Page 1 of 1 |
| APPLICATION NO. | : 10/799740 | |
| DATED | : May 13, 2008 | |
| INVENTOR(S) | : Barry Christopher Allyn | |

It is certified that error appears in the above-identified patent and that said Letters Patent is hereby corrected as shown below:

In Column 11, Line 23: delete "the" and insert -- an -- therefor.

Signed and Sealed this
Twenty-second Day of February, 2011

David J. Kappos
*Director of the United States Patent and Trademark Office*